United States Patent
Gray

(10) Patent No.: US 9,200,873 B2
(45) Date of Patent: Dec. 1, 2015

(54) MULTI-LAYER SOLID ELEMENT MOSAIC BODY ARMOR FOR ON-AXIS AND OFF-AXIS THREATS

(71) Applicant: Warwick Mills Inc., New Ipswich, NH (US)

(72) Inventor: Matthew C Gray, Rindge, NH (US)

(73) Assignee: Warwick Mills, Inc., New Ipswich, NH (US)

( * ) Notice: Subject to any disclaimer, the term of this patent is extended or adjusted under 35 U.S.C. 154(b) by 0 days.

(21) Appl. No.: 14/135,829

(22) Filed: Dec. 20, 2013

(65) Prior Publication Data

US 2014/0305292 A1    Oct. 16, 2014

Related U.S. Application Data

(60) Provisional application No. 61/739,966, filed on Dec. 20, 2012.

(51) Int. Cl.
    *F41H 5/04* (2006.01)
    *B32B 27/02* (2006.01)
    *F41H 1/02* (2006.01)

(52) U.S. Cl.
    CPC .............. *F41H 5/0471* (2013.01); *B32B 27/02* (2013.01); *F41H 1/02* (2013.01); *F41H 5/0464* (2013.01)

(58) Field of Classification Search
    CPC .................................................... F41H 5/0492
    USPC ................... 89/36.02, 36.01, 918, 921; 2/2.5; 428/911
    See application file for complete search history.

(56) References Cited

U.S. PATENT DOCUMENTS

| 5,915,528 | A  | * | 6/1999  | Shmuelov .......................... 2/2.5 |
| 7,874,239 | B2 |   | 1/2011  | Howland |
| 7,964,518 | B1 |   | 6/2011  | Bhatnagar et al. |
| 8,226,873 | B1 | * | 7/2012  | Martin et al. ................. 264/261 |
| 2005/0164577 | A1 | | 7/2005 | Reid et al. |
| 2009/0320675 | A1 | | 12/2009 | Landingham et al. |
| 2009/0320676 | A1 | | 12/2009 | Cronin et al. |

FOREIGN PATENT DOCUMENTS

EP          611943 A1 *  8/1994

OTHER PUBLICATIONS

International Search Report and Written Opinion for PCT Appl. No. PCT/US2013/0076831, dated Apr. 8, 2014, 11 pgs.
NIJ Standard for Stab Resistance of Personal Body Armor, NIJ Standard, National Law Enforcement and Corrections Technology Center, 46 pages, US Department of Justice, Washington, DC.
(Continued)

*Primary Examiner* — Reginald Tillman, Jr.
(74) *Attorney, Agent, or Firm* — Maine Cernota & Rardin

(57) ABSTRACT

A flexible mosaic armor system that defeats threats at any attack angle includes top and middle solid elements layers separated by uniform gaps that intersect at apexes. The top elements can have a "hem" shape with raised edges. The middle elements can be flat, or can also have a hem shape. In embodiments, the edges of the top and middle layers are aligned and separated by an offset that is three or four times the gap width. Off-axis spike and needle strikes are thereby trapped between the two solid element layers, without added textile reinforcement. Embodiments include an apex layer of solid elements that overlap the first layer apexes, the apex layer being the second layer or a third layer beneath the 2 upper layers. The apex layer can be sandwiched between two textile backer layers that provide a full uninterrupted bonding surface to all of the solid element layers.

58 Claims, 20 Drawing Sheets

(56) References Cited

OTHER PUBLICATIONS

Stab and Impact Resistance, Vereinigung der Prüfstellen für angriffshemmende Materialien und Konstruktionen (VPAM), May 18, 2011, 37 pages.

Croft, John and Longhurst, Daniel, HOSDB Body Armour Standards for UK Police (2007)—Part 3: Knife and Spike Resistance, 36 pages, Publication No. 39/07/C, Home Office Scientific Development Branch, Sandridge, St Albans, United Kingdom.

* cited by examiner

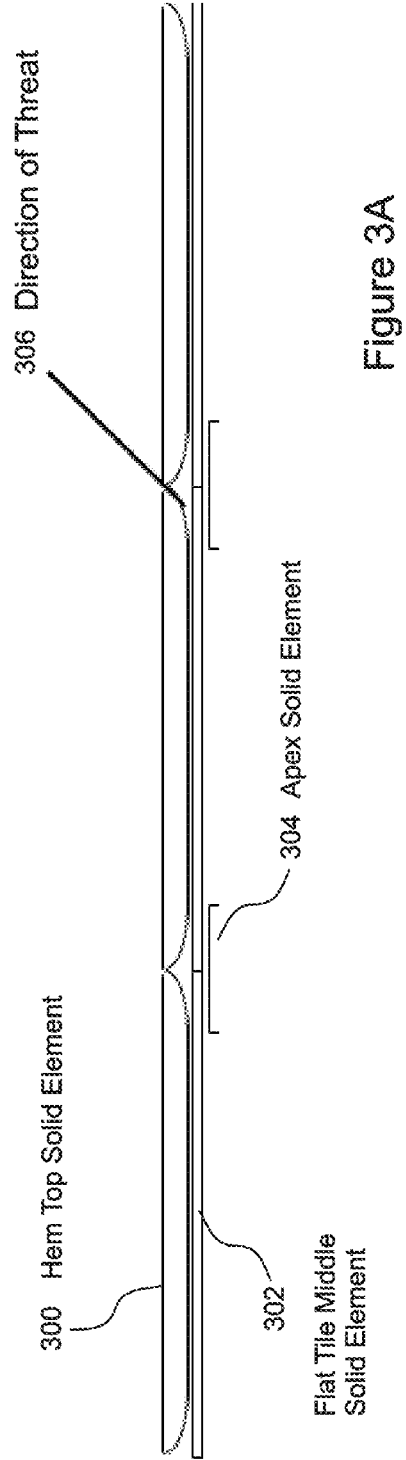
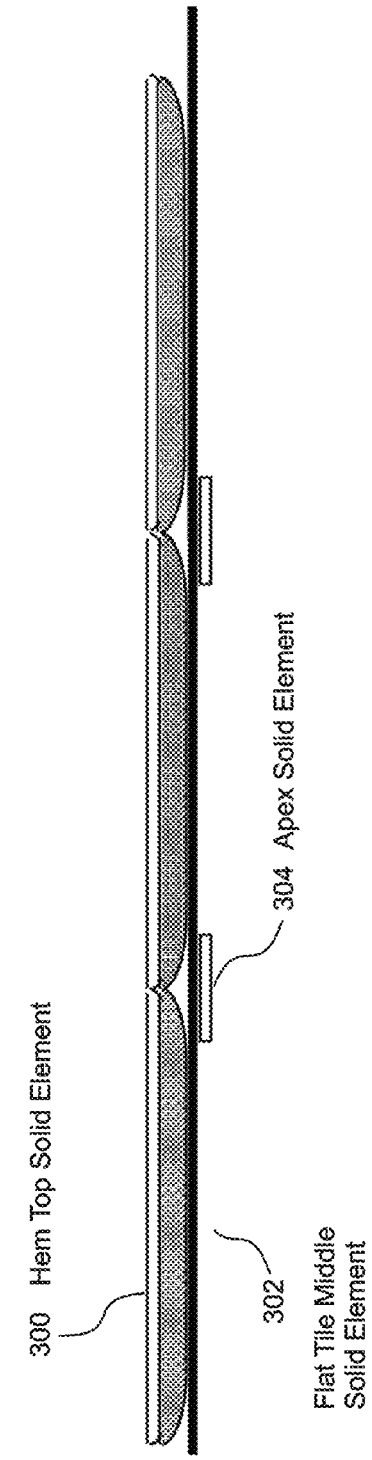

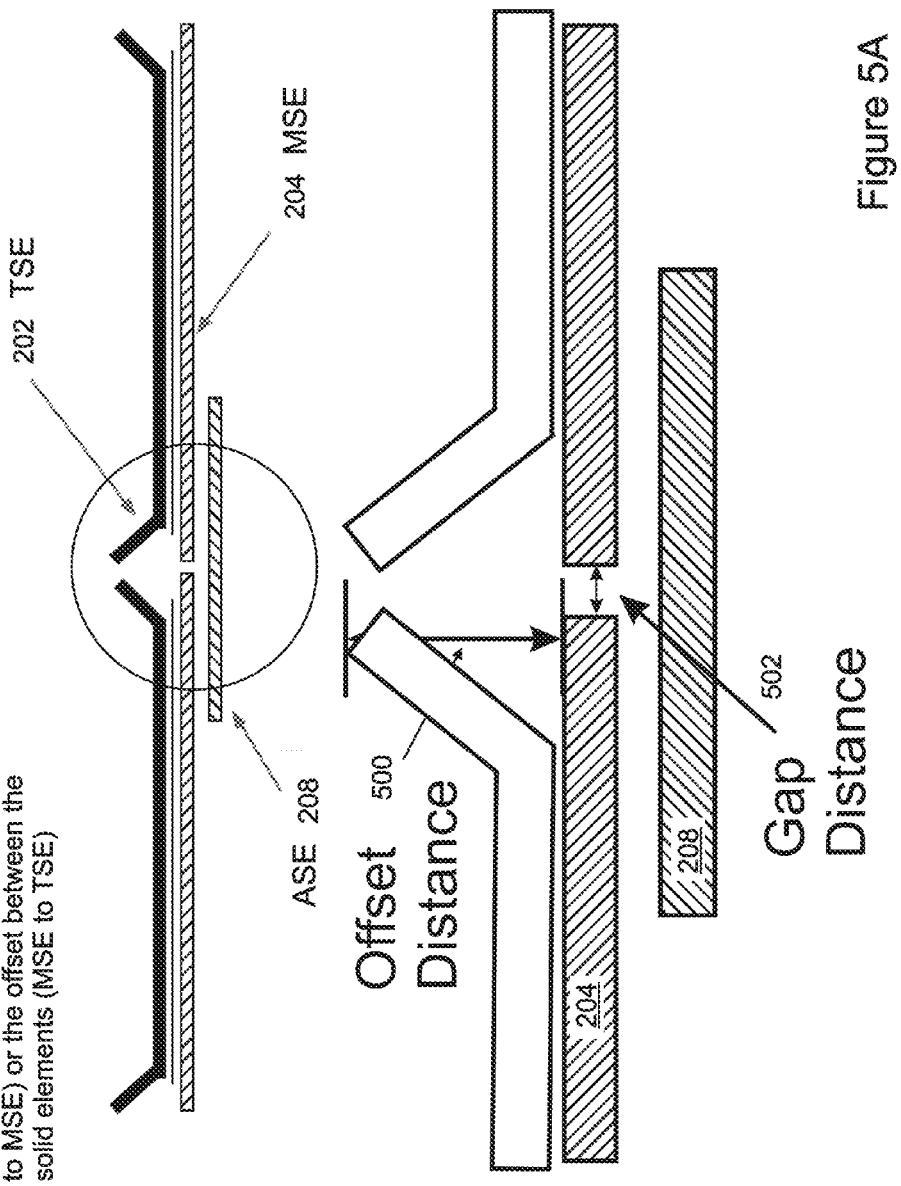

MULTI-LAYER SOLID ELEMENT MOSAIC BODY ARMOR FOR ON-AXIS AND OFF-AXIS THREATS

RELATED APPLICATIONS

This application claims the benefit of U.S. Provisional Application No. 61/739,966, filed Dec. 20, 2012, which is herein incorporated by reference in its entirety for all purposes.

FIELD OF THE INVENTION

The invention relates to body armor, and more particularly, to body armor that includes adjacent solid elements arranged in a mosaic pattern.

BACKGROUND OF THE INVENTION

Stab resistant body armor is typically constructed in one of two ways. One approach is to use a puncture resistant textile in a 15-30 ply layup to defeat spike threats. This approach however has limited capacity to stop higher energy attacks, and little or no performance for edged weapons.

Another approach is to use solid elements to protect against knife threats. A classic version of this approach is chain-male, which has good performance on knives, but poor performance on spikes and no performance on needles. Another version is to use a mosaic pattern of adjacent or overlapping solid tiles or other solid elements. However, this approach typically remains vulnerable to stab attacks at junctures between the solid elements, especially at certain critical angles of attack.

The main source of weakness for many of these mosaic solid element systems is their flex points. Mosaic solutions such as those defined in U.S. Pat. No. 7,874,239 have nearly continuous protective coverage. Unlike chain-male ring systems that have broadly discontinuous coverage, because each ring is at least partly open, the mosaic system of U.S. Pat. No. 7,874,239 is not vulnerable to needle and spike attacks normal or up to approximately 20 degrees away from normal. However, with reference to the simplified example of FIG. 1, at 45 degrees from normal the flex points in this mosaic solution can be defeated, for example by a spike as shown in FIG. 1, which is able to cut through the crest of the hem on the solid element at 45 degrees and pass under the adjacent solid element, leaving the threat with enough energy to penetrate the remaining fabric layers. The same effect is seen at angles of 65 degrees from normal. This problem can be especially acute when a penetrator strikes an apex in the mosaic system, due to the enhanced flexibility of the apexes, where the apexes are the points where the gaps between solid elements meet each other.

Some combination solutions attempt to overcome the limitations of the textile and solid element approaches by combining both solid elements and textile layups in a single design. However, this approach has issues with cost, thickness, and flexibility.

What is needed, therefore, is a stab-resistant mosaic body armor that protects against knife, spike, and needle attacks at virtually all attack angles, including at apexes, while minimizing cost and thickness and maximizing flexibility.

SUMMARY OF THE INVENTION

The present invention is a flexible armor system that defeats both normal and off-axis threats at virtually any attack angle. The invention is a mosaic system comprising at least two X-Y layers of solid elements. The top layer is a substantially area-filling array of solid element separated by gaps having a uniform gap width. The gap width of the top layer is sufficiently small to stop penetrators at their limiting penetration distance. In some embodiments, the second layer is a middle layer that is similar in construction to the top layer. In some of these embodiments the gaps of the top and middle layers are aligned, and the edges of the solid elements of the top level are offset in the Z-direction from the edges of the solid elements in the middle level. This configuration traps off-axis spike, knife, and needle strikes between the two layers of solid elements, and does not require added textile reinforcement.

In certain of these embodiments, the solid elements in at least one of the top and middle layers have a "hem" shape in which the bounding edges of the solid element is offset in the Z-direction from a central portion of the solid element, thereby creating a gap between the edges of the corresponding top and middle level solid elements even if the central portions of the top and middle solid elements are in direct contact. And in some of these embodiments the solid elements in both the top and middle layers have a "hem" shape.

In embodiments, a unique apex layer of solid elements is included, either as the second layer beneath the top layer, or as a third layer beneath the top and middle layers. The solid elements of the apex layer are positioned directly beneath the apexes of the top layer, which are the intersection points of the gaps of the top layer, so that the apex solid elements can stop any threat that attempts to penetrate the apexes of the top and middle layers. In some embodiments, the apex layer is sandwiched between two flexible textile backer layers, forming a backer sandwich that gives all the solid element layers a full, uninterrupted bonding surface to the flexible backer layer.

One general aspect of the present invention is a mosaic armor system for protection against a threat having a threat thickness at a failing penetration depth. The armor system includes a top layer of solid elements and a middle layer of solid elements, the solid elements in both layers being arranged in substantially space-filling X-Y arrays in which the solid elements are separated from each other by gaps that intersect at apexes, the gaps having a uniform gap width that is between 5% and 20% of the threat thickness at the failing penetration depth, the middle layer being offset from the top layer by an offset that is at least three times larger than the gap width, a front face of the middle layer being adhered to a back face of the top layer and fibrous top and bottom covering layers arranged so as to sandwich the two layers of solid elements there between.

In embodiments, the top fibrous covering layer is adhered to a front face of the top layer of solid elements.

In some embodiments, the top fibrous covering layer has a recoverable stretch of greater than 30% at less than 20 pounds per inch of load as measured by ASTM method D6614 or D2594. In other embodiments, the bottom fibrous covering layer has elongation at break of less than 20%.

Various embodiments further include an intermediate fibrous layer located between the top layer of solid elements and the middle layer of solid elements. 6. The mosaic armor system of claim 1, wherein all of the solid elements included in the top and middle layers are made of a material having an Rc hardness of at least 35.

In certain embodiments, the solid elements of the top and middle layers substantially share the same outline and are aligned with each other. In other embodiments the offset between the top and middle layers of solid elements is at least four times as large as the first gap size.

Various embodiments further include an apex XY layer of solid elements having a front side adhered to a back side of the first fibrous backing layer, the apex solid elements being located directly behind the apexes of the top layer of solid elements. Some of these embodiments further include a fibrous backing layer adhered to a back side of the apex layer, so that the apex solid elements are sandwiched between the fibrous bottom covering layer and the fibrous apex backing layer. And in some of these embodiments the fibrous apex backing layer has elongation at break of less than 20%.

Various embodiments that include an apex XY layer of solid elements further include up to 4 fibrous backing layers behind the apex solid element layer. In other of these embodiments the apex solid elements have a largest dimension of greater than 0.2 inches. And in still other of these embodiments all of the solid elements included in the apex layer are made of a material having an Rc hardness of at least 35.

In embodiments, the armor system defeats both edged blade and spike threats at 45 degrees at energies up to 24 Joules with less than 7 mm of penetration, and at 0 degrees at energies up to 36 Joules with less than 20 mm of penetration.

In some embodiments, a thickness of the solid elements of the middle layer is between 35% and 250% of a thickness of the solid elements of the top layer.

In other embodiments the front face of the middle layer is adhered to the back face of the top layer by a first adhesive that includes a neoprene elastomer.

In various embodiments the top and middle layers of solid elements are attached to each other by an attachment having at least 10 lbf of shear strength per square inch.

In certain embodiments the fibrous bottom covering layer is attached to the middle layer of solid elements by an attachment having greater than 10 lbf of shear strength per square inch. And some embodiments further include at least one adhesive layer that includes a neoprene elastomer.

Another general aspect of the present invention is a mosaic armor system that includes a top layer of solid elements and a middle layer of solid elements, the solid elements in both layers being arranged in substantially space-filling X-Y arrays in which the solid elements are separated from each other by gaps that intersect at apexes, the solid elements of the top and middle layers substantially sharing the same outline and being aligned with each other, the solid elements of the top layer having edges that are offset in the Z direction from edges of the solid elements in the middle layer by an offset that is greater than a thickness of the top layer solid elements or a thickness of the middle layer solid elements, a front face of the middle layer being adhered to a back face of the top layer, and an apex XY layer of solid elements located directly behind the apexes of the top and middle layers of solid elements.

In embodiments, a thickness of the solid elements of the middle layer is between 35% and 250% of a thickness of the solid elements of the top layer.

Various embodiments further include fibrous top and bottom covering layers arranged so as to sandwich the top and middle layers of solid elements there between. In some of these embodiments, the fibrous top covering layer has a recoverable stretch of greater than 30% at less than 20 pounds per inch of load as measured by ASTM method D6614 or D2594. In other of these embodiments, the fibrous bottom covering layer has elongation at break of less than 20%. And in still other of these embodiments, the fibrous bottom covering layer is attached to the middle layer of solid elements by an attachment having greater than 10 lbf of shear strength per square inch.

Certain embodiments further include an intermediate fibrous layer located between the top layer of solid elements and the middle layer of solid elements. In some embodiments the top and middle layers of solid elements are attached to each other by an attachment having at least 10 lbf of shear strength per square inch. In other embodiments, all of the solid elements included in the top and middle layers are made of a material having an Rc hardness of at least 35.

In certain embodiments all of the solid elements included in the apex layers are made of a material having an Rc hardness of at least 35.

In various embodiments the armor system defeats both edged blade and spike threats at both 0 degrees and 65 degrees at energies up to 15 Joules with less than 10 mm of penetration, and at energies up to 25 Joules with less than 20 mm of penetration.

In some embodiments an offset between the top and middle layers of solid elements is greater than or equal to the gap between the solid elements in each of the top and middle layers. In other embodiments an offset between the top and middle layers of solid elements is greater than or equal to the thickness of the top layer of solid elements or the middle layer of solid elements.

Embodiments further include fibrous top and bottom covering layers arranged so as to sandwich the top and middle layers of solid elements there between, and a fibrous backing layer adhered to a back side of the apex layer, so that the apex solid elements are sandwiched between the fibrous bottom covering layer and the fibrous backing layer.

In some embodiments the fibrous backing layer has elongation at break of less than 20%. Other embodiments further include up to 4 fibrous backing layers adhered to a back side of the apex solid element layer.

In various embodiments the apex solid elements have a largest dimension that is greater than 0.2 inches. And in certain embodiments the front face of the middle layer is adhered to the back face of the top layer by a first adhesive that includes a neoprene elastomer.

Yet another general aspect of the present invention is a mosaic armor system that includes a top layer of solid elements and a middle layer of solid elements, the solid elements in both layers being arranged in substantially space-filling X-Y arrays in which the solid elements are separated from each other by gaps that intersect at apexes, the solid elements of the top and middle layers substantially sharing the same outline and being aligned with each other. The mosaic armor further includes fibrous top and bottom covering layers arranged so as to sandwich the two layers of solid elements there between, the fibrous top covering layer having a recoverable stretch of greater than 30% at less than 20 pounds per inch of load as measured by ASTM method D6614 or D2594, the fibrous bottom covering layer having elongation at break of less than 20%.

In embodiments, the top and middle layers of solid elements are attached to each other by an attachment having at least 10 lbf per square inch of shear strength. In some embodiments, the fibrous bottom covering layer is attached to the middle layer of solid elements by an attachment having greater than 10 lbf of shear strength per square inch. In other embodiments, all of the solid elements included in the top layer are made of a material having an Rc hardness of at least 35.

Various embodiments further include an intermediate fibrous layer located between the top layer of solid elements and the middle layer of solid elements.

Certain embodiments further include an apex XY layer of solid elements located directly behind the apexes of the top and middle layers of solid elements. Some of these embodiments further include a fibrous backing layer adhered to a back side of the apex layer, so that the apex solid elements are sandwiched between the fibrous bottom covering layer and the fibrous backing layer. Other of these embodiments further include up to 4 fibrous backing layers adhered to a back side of the apex layer, so that the apex solid elements are sandwiched between the fibrous bottom covering layer and the two fibrous backing layers. And in some of these embodiments at least one of the fibrous backing layers has elongation at break of less than 20%.

In various embodiments that include an apex XY layer of solid elements, the apex solid elements have a largest dimension of greater than 0.2 inches. And in certain embodiments all of the solid elements included in the apex layers are made of a material having an Rc hardness of at least 35.

Still another general aspect of the present invention is a mosaic armor system that includes a top layer of solid elements and a middle layer of solid elements, the solid elements in both layers being arranged in substantially space-filling X-Y arrays in which the solid elements are separated from each other by gaps that intersect at apexes, the solid elements of the top and middle layers substantially sharing the same outline and being aligned with each other, an apex XY layer of solid elements located directly behind the apexes of the top and middle layers of solid elements, a fibrous bottom covering layer arranged between the middle layer of solid elements and the apex layer of solid elements, the fibrous bottom covering layer having elongation at break of less than 20%, and a fibrous backing layer adhered to a back side of the apex layer, so that the apex solid elements are sandwiched between the fibrous bottom covering layer and the fibrous backing layer.

In embodiments, all of the solid elements included in the top and middle layers are made of a material having an Rc hardness of at least 35. In some embodiments all of the solid elements included in the apex layers are made of a material having an Rc hardness of at least 35.

Various embodiments further include an additional fibrous backing layer adhered to a back side of the apex layer, so that the apex solid elements are sandwiched between the fibrous bottom covering layer and the two fibrous backing layers. And in some of these embodiments at least one of the fibrous backing layers has elongation at break of less than 20%.

In certain embodiments the top and middle layers of solid elements are attached to each other by an attachment having at least 10 lbf of shear strength per square inch.

Embodiments further include an intermediate fibrous layer located between the top layer of solid elements and the middle layer of solid elements. in some embodiments the fibrous bottom covering layer is attached to the middle layer of solid elements by an attachment having greater than 10 lbf of shear strength per square inch. And in various embodiments the apex solid elements have a largest dimension of greater than 0.2 inches.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 3A is a side view of an embodiment of the present invention where the top solid elements are hem-shaped and the middle solid elements are flat;

FIG. 3B is a side view of an embodiment of the present invention where both the top solid elements and the middle solid elements are hem-shaped;

FIG. 5A is a cross-sectional view of an embodiment in which the top layer has a hem shape and the middle layer is flat, including an enlargement comparing the offset distance with the gap size;

DETAILED DESCRIPTION

Figure 1:
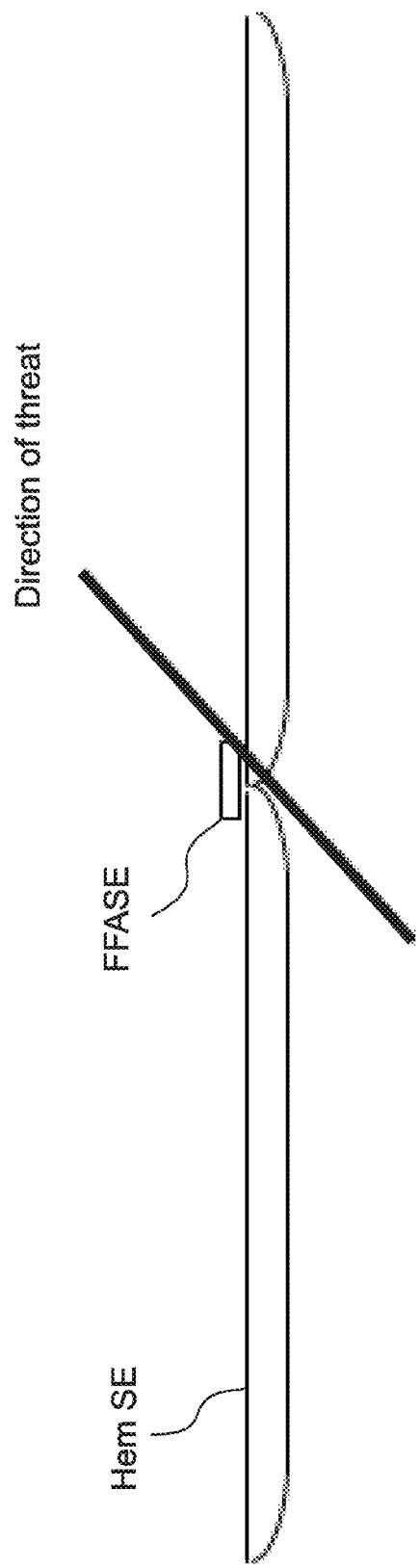
FIG. 1 is a side view illustration of penetration of a prior art armor system by a spike applied at a 45 degree angle to a joint between solid elements.
Figure 2A:
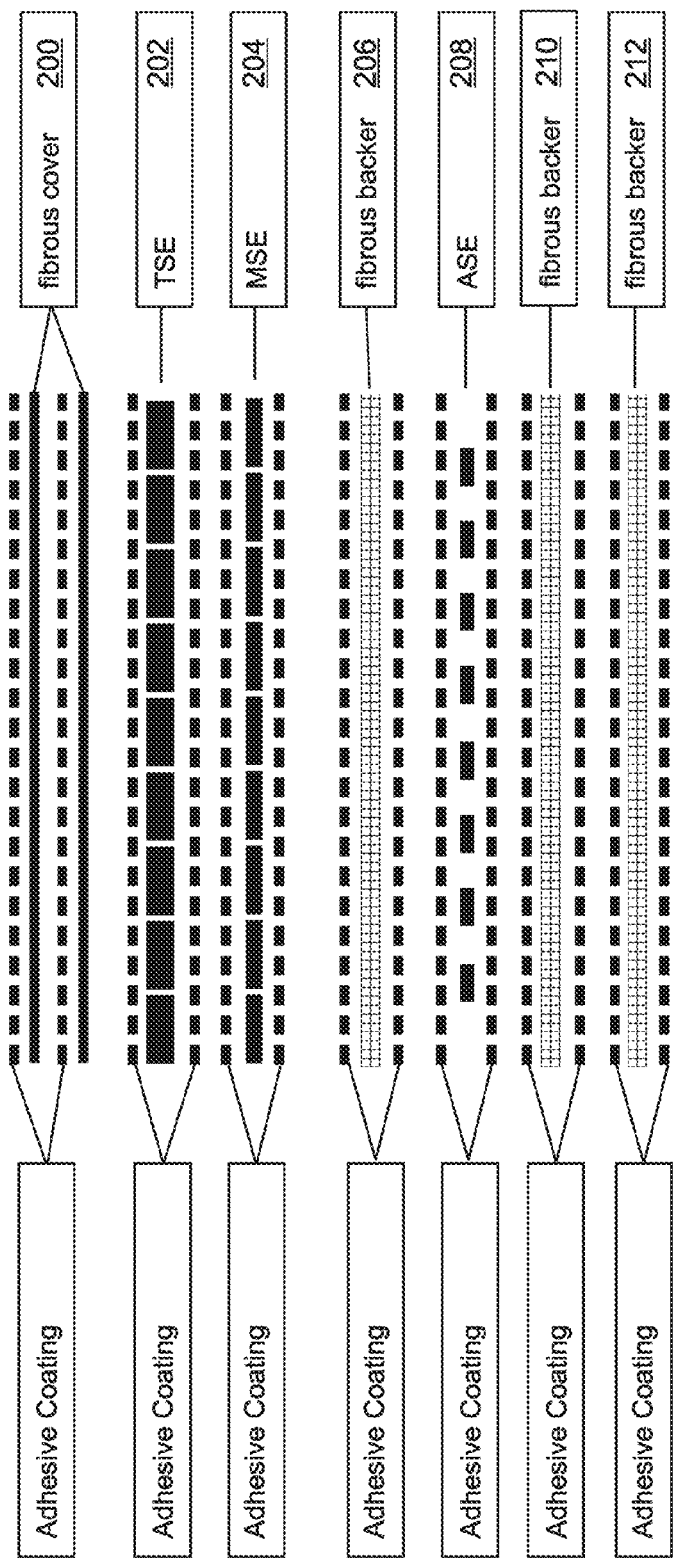
FIG. 2A is a cross-sectional illustration of the layers of an embodiment of the present invention that includes a top layer of solid elements, a middle layer of solid elements, and an apex layer of solid elements.

The present invention is a flexible armor system that defeats both normal and off-axis threats at virtually any attack angle. With reference to FIG. 2A, the invention is a mosaic system comprising at least 2 layers of solid elements 202, 204. The top layer 202 is a substantially area-filling array of solid elements 202 separated by gaps having a uniform gap width. The gap width of the top layer is sufficiently small to stop penetrators at their limiting penetration distance. In certain embodiments, the gap between the solid elements 202 of the top layer is between 7% and 15% of a threat width at the limiting penetration distance.

In the embodiment of FIG. 2A, the second layer is a middle layer 204 that is also a substantially area-filling array of solid elements separated by gaps having a uniform width. In some embodiments, the gaps of the top and middle layers are aligned in the Z-direction so that the two upper layers of solid elements 202, 204 substantially share a common outline in the x-y plane, and there is a unique offset between the bounding edges of the corresponding solid elements in the top and middle layers. This configuration traps off-axis spike and needle strikes between the two layers of solid elements 202, 204, and does not require added textile reinforcement. In some of these embodiments, the offset between the edges of the corresponding top and middle solid elements in the two layers 202, 204 is greater than or equal to the thickness of the top layer solid elements 202. See also FIG. 5B, described in more detail below.

In some embodiments, the top and middle layers 202, 204 are sandwiched between an upper fibrous layer 200 that has recoverable stretch of greater than 30% at less than 20 pounds per inch of load as measured by ASTM method D6614 or D2594, where materials that meet this requirement are referred to herein as "low modulus" materials, and a lower fibrous layer 206 that has elongation at break of less than 20%, where materials that meet this requirement are referred to herein as "high modulus" materials.

In other embodiments, the top and middle layers 202, 204 are sandwiched between an upper fibrous layer 200 that has recoverable stretch of greater than 30% at less than 20 pounds per inch of load as measured by ASTM method D6614 or D2594, and a lower fibrous layer 206 that has elongation at break of less than 20%.

The embodiment of FIG. 2A further includes a unique apex solid element layer 208 beneath the other 2 layers 202, 204. The solid elements of the apex layer 208 are positioned directly beneath the apexes of the top layer 202, which are the intersection points of the gaps of the top layer, so that the apex solid elements can stop any threat that attempts to pass through the apexes of the top and middle layers. In the embodiment of FIG. 2A, this apex layer 208 is sandwiched between two flexible textile backer layers 206, 210, forming a backer "sandwich" that gives all the solid element layers a full uninterrupted bonding surface to the flexible backer layers.

In various embodiments, there is at least one flexible backer fibrous layer 206 between the apex solid element layer 208 and the first 2 solid element layers 202, 204 and at least one additional low elongation backer layer 210, 212 that sandwiches the apex layer 208 of solid elements.

In various embodiments, there is at least one flexible backer fibrous layer 206 between the apex solid element layer 208 and the first 2 solid element layers 202, 204 four additional low elongation backer layer 210, 212 that sandwiches the apex layer 208 of solid elements.

In some embodiments, the solid elements of the top, middle, and/or apex layers 202, 204, 208 are made of material of at least Rc hardness of >35. The solid elements ("SE's") can be adhered together between at least 2 fibrous covering layers. The offset between the edges of the top and middle layer solid elements can be greater than three times the gap size of the top layer, and in some embodiments greater than four times the gap size of the top layer.

Figure 2B:
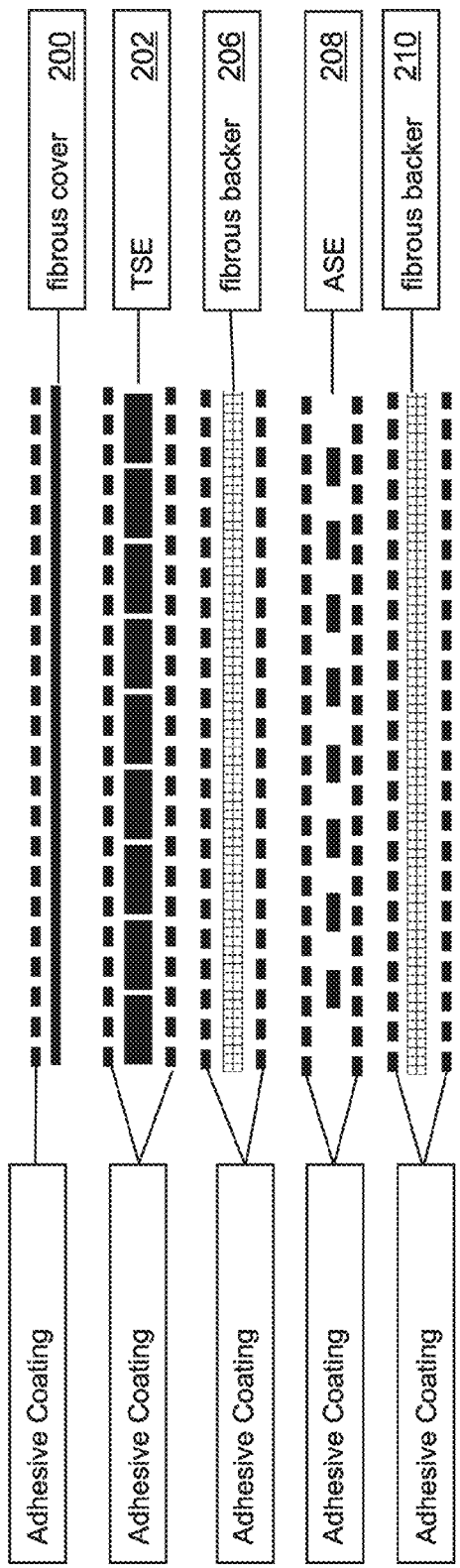
FIG. 2B is a cross-sectional illustration of the layers of an embodiment of the present invention that includes a top layer of solid elements and an apex layer of solid elements, without including a middle layer of solid elements.

In various embodiments, the middle layer is omitted. With reference to FIG. 2B, in other general aspects of the present invention, the second layer is the apex layer 208, as described above, and the middle layer 204 of solid elements is omitted.

Figure 2C:
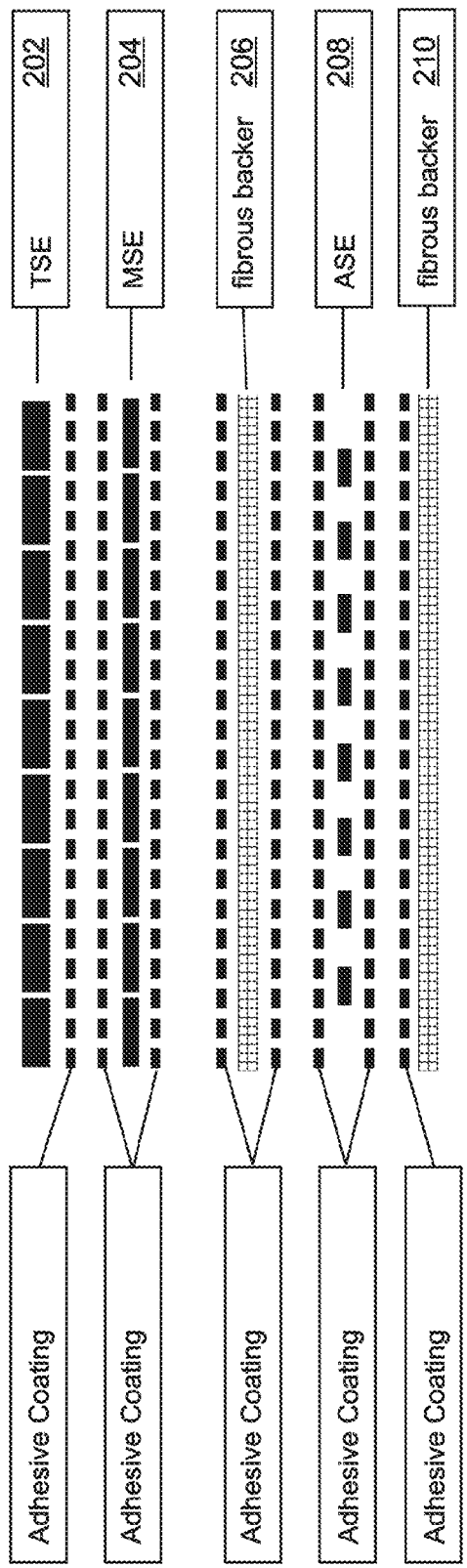
FIG. 2C is a cross-sectional illustration of the layers of an embodiment similar to FIG. 2A, but including fibrous layers only between the top layer of solid elements and the apex layer of solid elements, and behind the apex layer of solid elements, without including a fibrous layer on top of the top layer of solid elements.

With reference to FIG. 2C, some embodiments include fibrous layers only between the top layer of solid elements and the apex layer of solid elements, and behind the apex layer of solid elements, without including a fibrous layer on top of the top layer of solid elements.

Figure 2D:
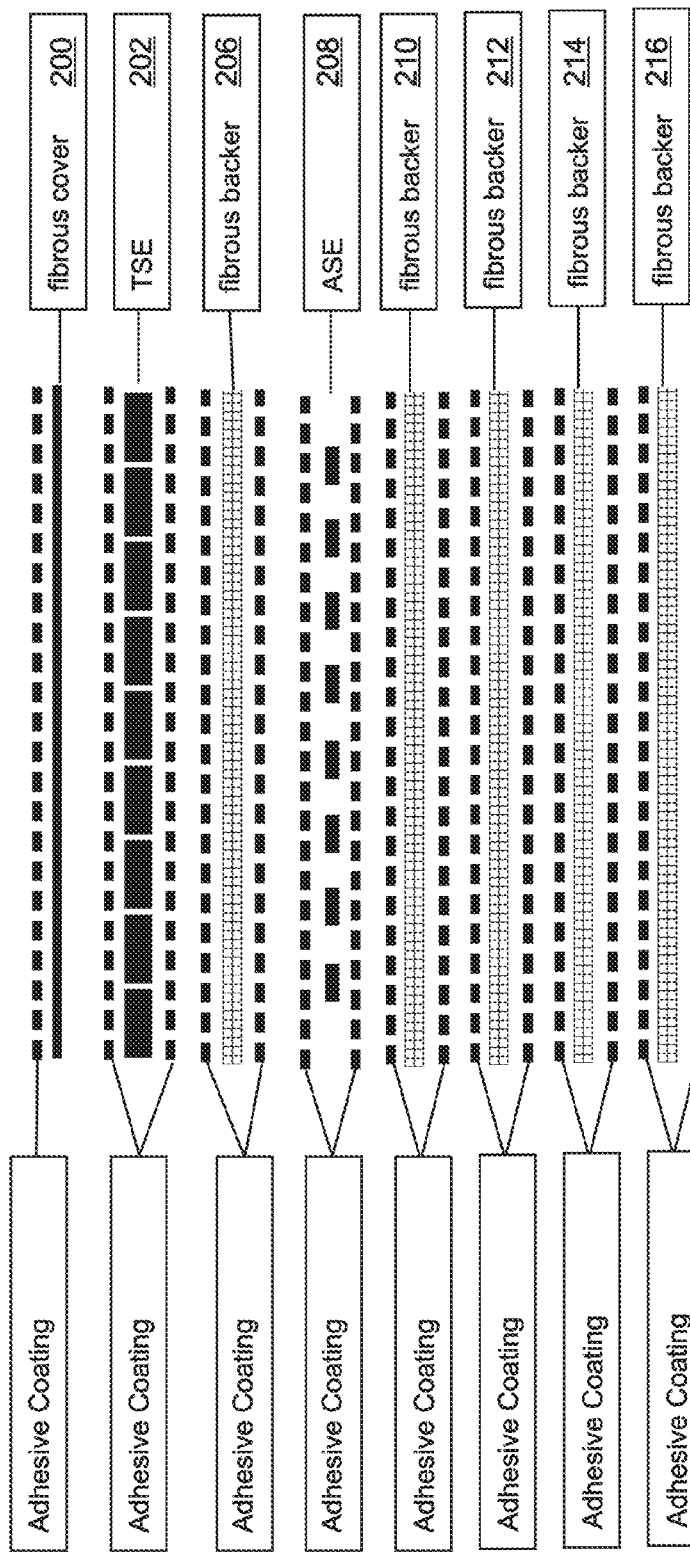
FIG. 2D is a cross-sectional illustration of the layers of an embodiment similar to FIG. 2B, but including four low elongation fibrous backer layers behind the apex layer 208 of solid elements.

With reference to FIG. 2D, in certain embodiments there is at least one flexible fibrous backer layer 206 between the apex solid element layer 208 and the first solid element layer 202, and up to four low elongation backer layers behind the apex layer 208 of solid elements. In various embodiments, at least one of the backer layers is a high modulus layer, and in some embodiments, at least one of the backer layers is a low modulus layer.

Figure 2E:
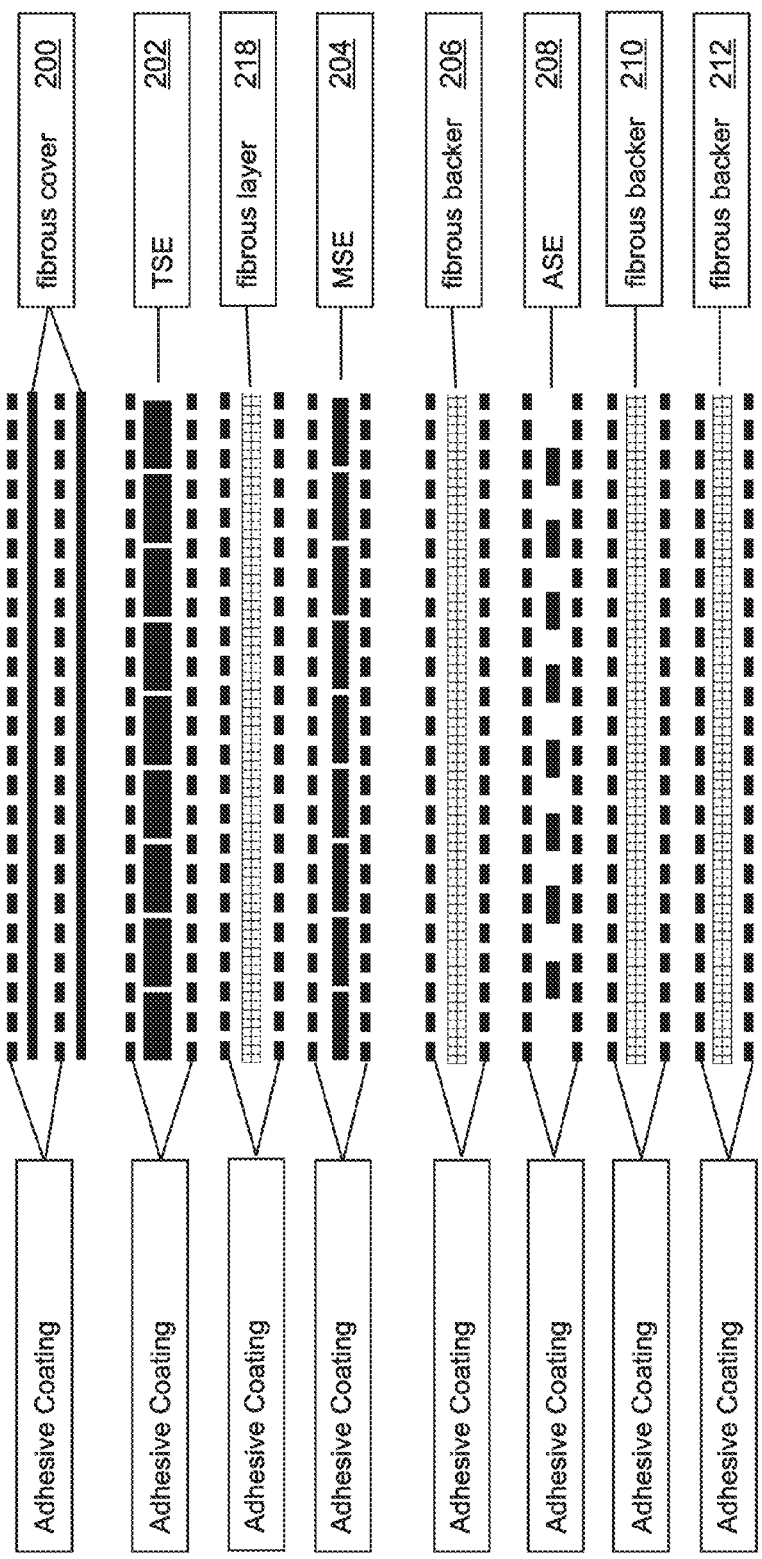
FIG. 2E is a cross-sectional illustration of the layers of an embodiments similar to FIG. 2A, but including an additional fibrous intermediate layer between the top layer of solid elements and the middle layer of solid elements.

And with reference to FIG. 2E, some embodiments further include an intermediate fibrous layer 218 between the top layer of solid elements 202 and the middle layer of solid elements 204. The intermediate fibrous layer 218 can be of low modulus or high modulus.

Note that terms used herein are defined as follows:

A Solid Element ("SE") apex is formed by the intersection of the corners of adjacent solid elements. In the case of triangular solid elements, 6 SE's meet to form the apex. In the case of square solid elements, 4 SE's meet to form the apex, and so on.

Solid Element types include
Apex Solid Elements (ASE's)
Top Solid Elements (TSE's) nearest the strike face
Middle Solid Elements (MSE's) between the TSE and the ASE layers
The x-y plane is the surface of the fibrous layers
The z-direction is normal to the fibrous layers
Offsets are in the z direction
Gaps are in the x-y plan
The threat thickness is the measured thickness of a threat measured at the penetration limit in the smaller of its cross sectional dimensions.

When tested in accordance to ASTM D751 ADHESION OF COATING TO FABRIC, the stretch material of the upper fibrous cover layer 200 in various embodiments has at least 2 lb/in of peel strength when bonded to itself. In some embodiments, this upper layer 200 is made of a nylon lycra knit fabric with an 8 oz/yd2 basis weight and 30-50% recoverable stretch at less than 10 pounds per inch, as measured by ASTM method D6614 or D2594 methods in both courses and wails. Stretch wovens and/or stretch non-wovens may also be used for the cover layer 200. In embodiments, the cover layer 200 has enough abrasion resistance to support the fielded life of the product. In certain embodiments, the cover layer 200 is a coated cover knit that has an elongation of 240% at an average load of 48 lbf when tested on a tensile testing machine at a rate of 12 in/min at 1 inch width and a 3 inch gauge length.

In embodiments, the backing layer 206 that is closest to the upper solid element layers 202, 204 is a coated woven of at least 15 gpd. In some embodiments, when a one inch overlap of 2 pieces of the material is tested in shear force on a tensile testing machine at a rate of 12 in/min, the bond between the material pieces has at least 300 lbf of shear strength. In certain embodiments, when tested on a tensile testing machine at a rate of 12 in/min at 1 inch width and a 3 in gauge length, the elongation at break is less than 20%, and in some embodiments it is less than 10%.

In various embodiments, the bond between the two upper solid element layers 202, 204 has at least 10 lbf per square inch of shear strength when tested in shear force on a tensile testing machine at a rate of 12 in/min. In some embodiments, the adhesive is vulcanizing elastomer and is cured under pressure and elevated temperature. In certain embodiments, when the bond between these solid element layers 202, 204 and the backer material 206 is tested in shear force on a tensile testing machine at a rate of 12 in/min, the bond between the material pieces has greater than 10 lbf per square inch of shear strength per square inch.

The woven fibrous backer layers 206, 210, 212 can be made from para aramid, LCP polyester, UHMWPE, nylon, polyester, or another fiber having greater than 4 gpd tenacity, and in some embodiments greater than 10 gpd tenacity. The adhesive can be neoprene, SBR, Urethane, or another polymer or elastomer with greater than 50% elongation at break.

In various embodiments, each solid element is a coated metallic element with at least 1275 MPa of tensile strength and greater than 3% elongation. In some of these embodiments, the metal is work-hardened stainless steel, medium to high carbon steel, type 4 or type 5 titanium, or a high-hardness aluminum alloy. The TSE offset in embodiments is made by forming a continuous hem around the perimeter of the top layer solid element. In some embodiments, the hardness of the solid elements is at least equal to the hardness of the threats. However, this requirement does not apply to other embodiments, such as in the case of alloy aluminum where the hardness can be lower but the thickness of the solid elements must be higher than in steel or titanium.

Apex Solid Elements can be round, hexagonal or other shapes having the required dimensions. Top solid elements closest to strike face can be equilateral triangles that have a hem on all 3 sides to create the required offset distances between the edges of the upper and middle level solid elements. Middle solid elements can also be equilateral triangles made of flat material or with a lower or the same hem as the top solid elements to preserve the offset distance. Triangular and hexagonal configurations are preferred in some embodiments over squares or rectangles because these systems have added flex lines and flex along 3 axes rather than only 2.

A side view of an embodiment of the present invention is presented in FIG. 3A. In this embodiment, the top solid elements or "TSE" 300 have raised edges, to create a "hem" shape, while the middle solid elements or "MSE" 302 are flat, and have a thickness of between 35% and 250%% of the TSE thickness. The TSE and MSE solid elements 300 are stacked on top of one another with their edges aligned, so that if a threat (such as the spike shown in the figure) strikes the hem of the TSE 300, and cuts through the crest of the hem, going under the adjacent TSE 300, it then comes in contact with the face of the MSE 302 below the adjacent TSE 300. Unable to penetrate the MSE 302, the threat (spike) begins to bend, before coming to a stop between the top 202 and middle 204 solid element layers.

A side view of an embodiment of the present invention is presented in FIG. 3B. In this embodiment, both the TSE elements 300 and the MSE elements 302 have raised edges, to create a "hem" shape. In various embodiments, the MSE elements 302 have a thickness of between 35% and 250% of the TSE thickness. The TSE and MSE solid elements 300 are stacked on top of one another with their edges aligned, so that if a threat (such as the spike shown in the figure) strikes the hem of the TSE 300, and cuts through the crest of the hem, going under the adjacent TSE 300, it then comes in contact with the face of the MSE 302 below the adjacent TSE 300. Unable to penetrate the MSE 302, the threat (spike) begins to bend, and being forced into the hem of the MSE and coming to a stop between the top 202 and middle 204 solid element layers. In some instances, the threat (spike) is forced out of the TSE layer.

The intersections or apexes of gaps between the solid elements in the embodiment of FIG. 3 represent a weakness to penetration, due at least in part to the enhanced flexibility at the apexes. This is overcome in the embodiment of FIGS. 3A and 3B by placing the solid elements 304 of the ASE layer 208 behind the apexes of the TSE 202 and the MSE 204. In embodiments, the largest dimension of the ASE is 0.2-0.5". The larger the size of the ASE, the greater the protection area provided near the apex, and the more surface area provided for adhesion of the apex element, making it harder for the threat (spike) to penetrate or move the ASE out of position upon impact. The placement of the ASE between 2 backer layers 206, 210 provides a full adhesive bonding surface for the MSE 200 and the ASE 202 on the sandwiched backers 206, 210. By placing the ASE 308 between two backing layers 206, 210, the ASE 208 does not interfere with the bonding area of the MSE 204 layer, and vice versa.

Figure 4:
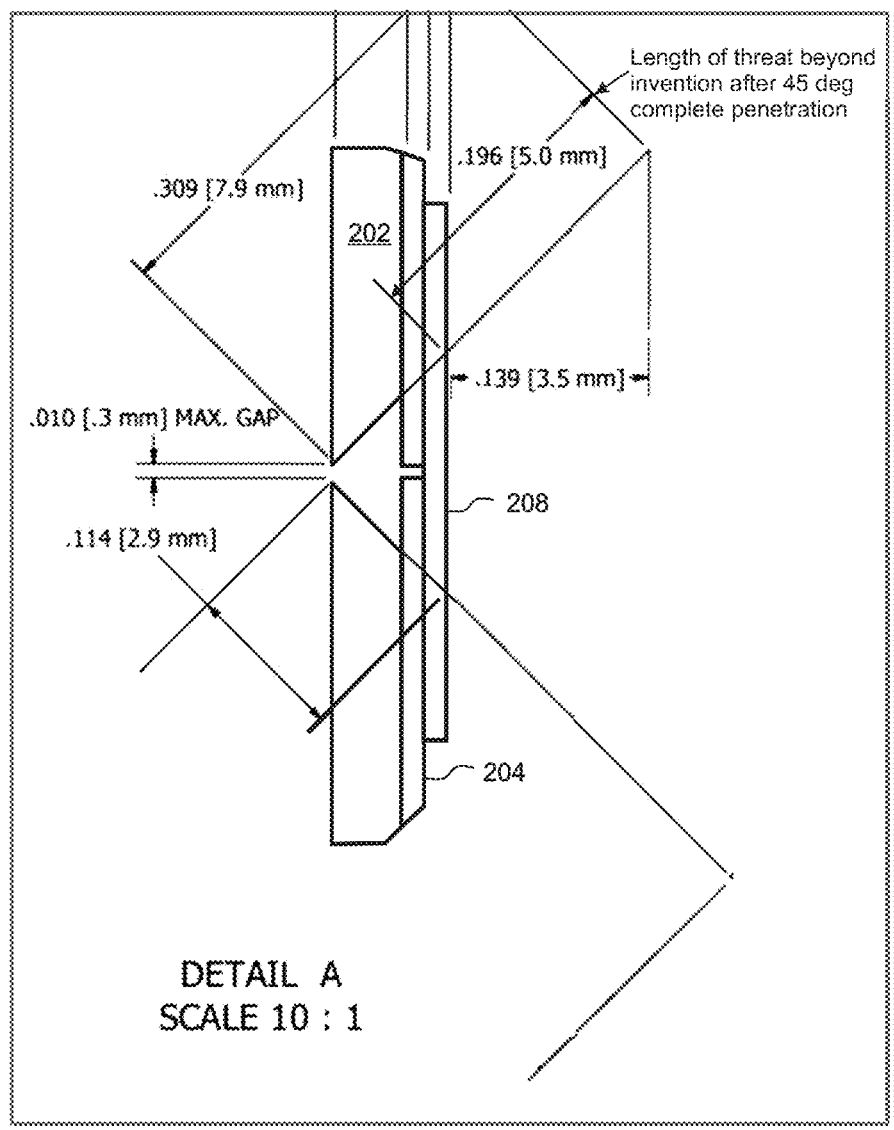
FIG. 4 is a cross-sectional view of an embodiment showing specific threat and embodiment dimensions.

With reference to FIG. 4, in various embodiments the TSE 202, MSE 204, and ASE 208 elements have the dimensions shown. After a penetration of a threat, the length of the threat beyond the panel is measured. The figure shows 2 adjacent MSE's 204 and a threat having a length of 5 mm beyond the panel at 45 degrees.

A cross-sectional view of an embodiment similar to FIG. 3A is presented in FIG. 5A. Details of the relative offset size and gap distance are presented in the detailed enlargement. The threat and failure modes of the embodiment are explained in terms of the gap size 500 between the solid elements (e.g. MSE to MSE) and/or the offset distance 502 between the solid elements (MSE to TSE)

Figure 5B:
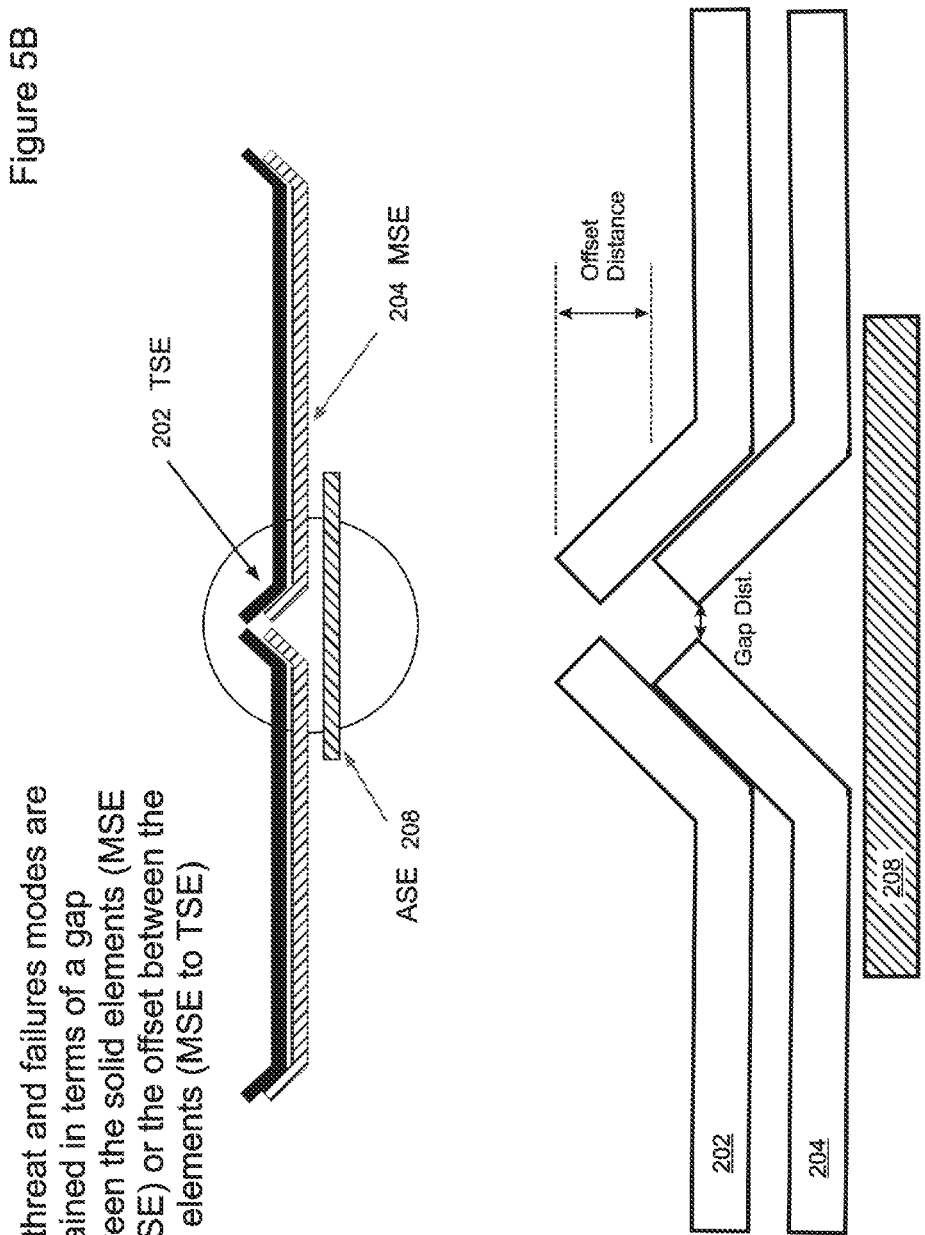
FIG. 5B is a cross-sectional view of an embodiment in which both the top and middle layers have a hem shape, including an enlargement comparing the offset distance with the gap size.

A cross-sectional view of an embodiment similar to FIG. 3B is presented in FIG. 5B. Details of the relative offset size and gap distance are presented in the detailed enlargement. The threat and failure modes of the embodiment are explained in terms of the gap size 500 between the solid elements (e.g. MSE to MSE) and/or the offset distance 502 between the solid elements (MSE to TSE).

Figure 6A:
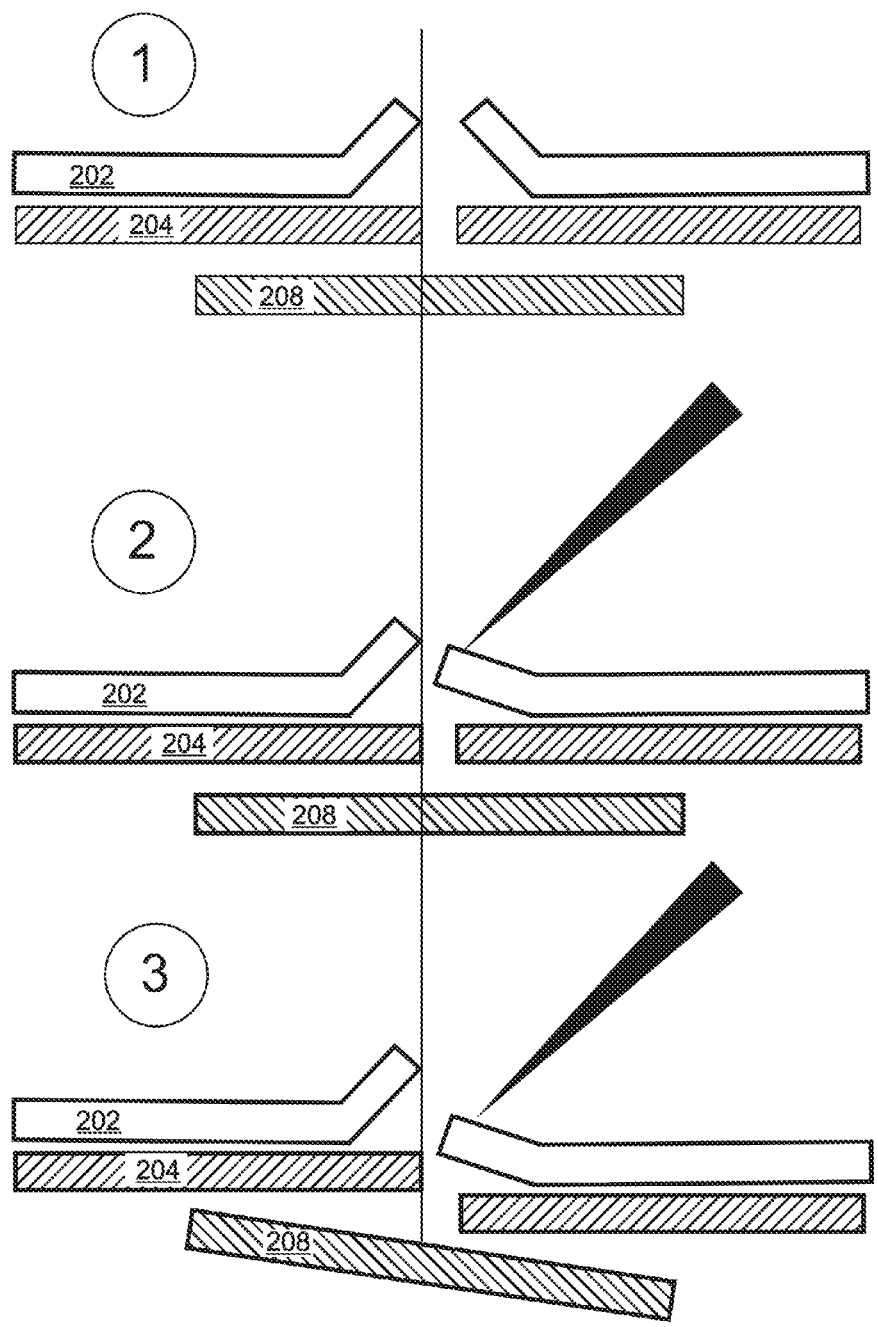
FIGS. 6A-6C are series of cross-sectional side views showing penetrators attempting to penetrate embodiments similar to FIG. 5 with an attack angle of 45 degrees, where in FIG. 6A the offset between the MSE layer and the TSE layer is less than 3 times the gap between the MSE's, the offset in FIG. 6B between the MSE layer and the TSE layer is 5 times the gap between the MSE's, and in FIG. 6C the offset between the MSE layer and the TSE layer is greater than 5 times the gap between the MSE's.
Figure 6B:
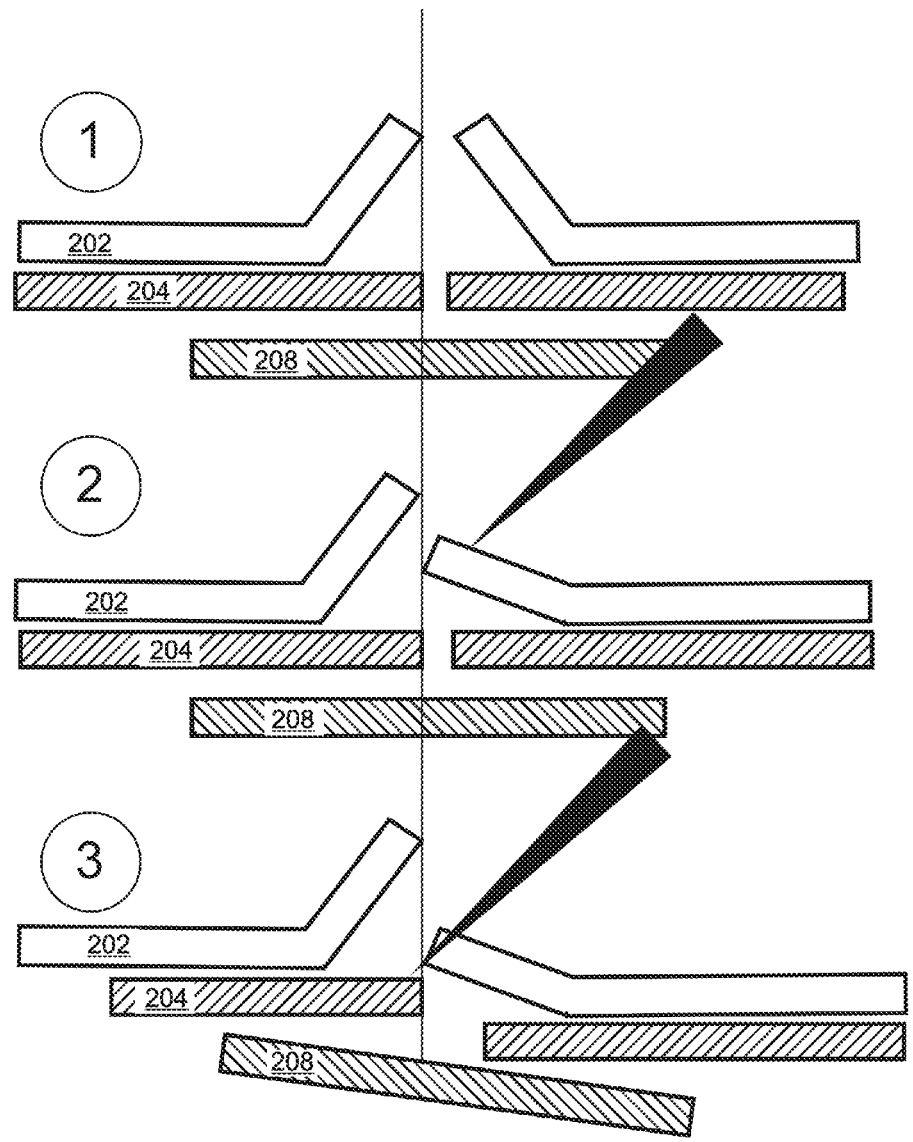
Figure 6C:
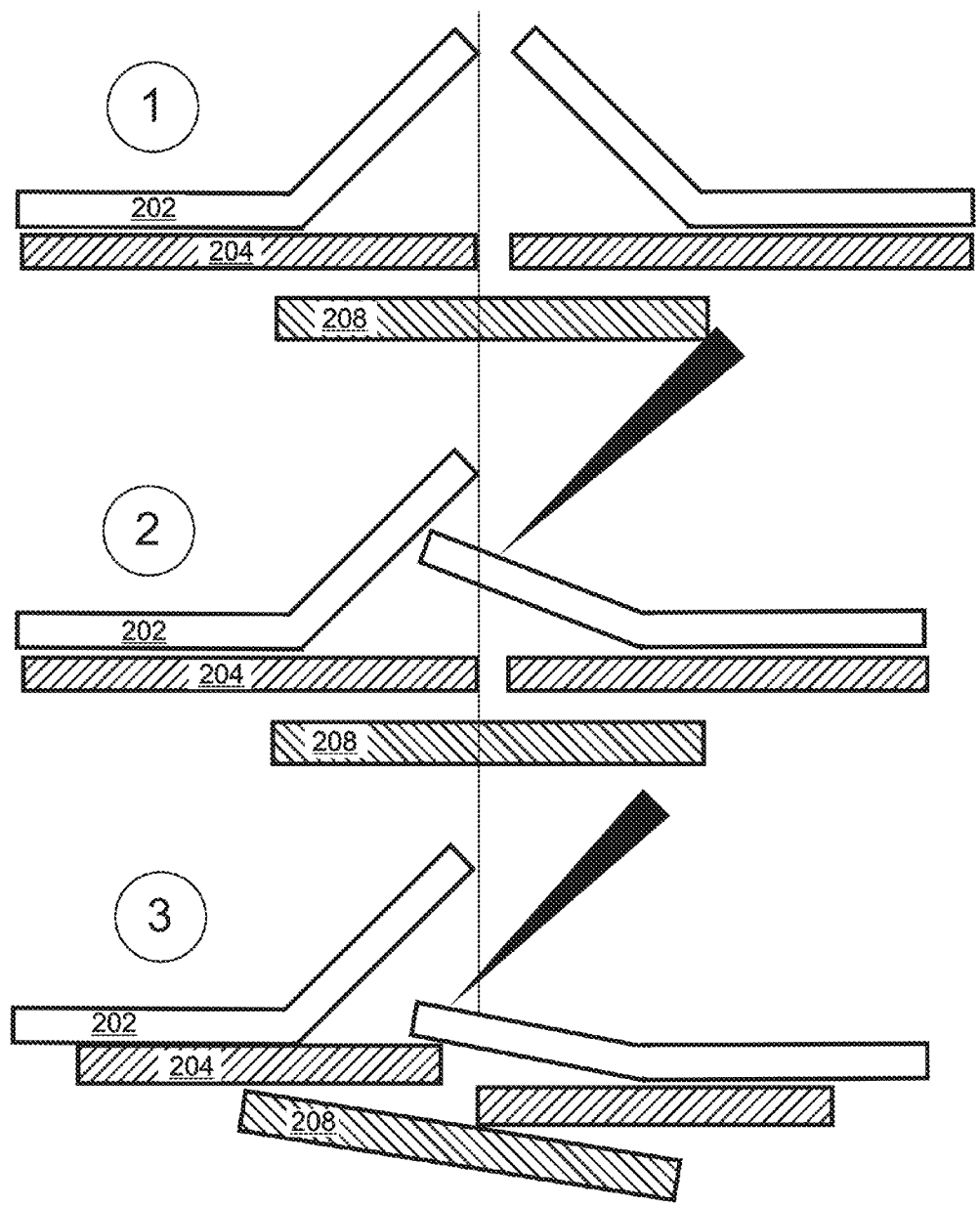

FIGS. 6A through 6C illustrate the interaction between the gap size and the offset distance for embodiments similar to FIG. 5A. When the offset between the edges of corresponding solid elements in the MSE layer and the TSE layer 204 is less than 3 times the gap between the MSE's 204, as shown in FIG. 6A, the threat is able to push through all the SE's and into the ASE. However, when the offset between the MSE layer 204 and the TSE layer is 5 times the gap between the MSE's 204, the threat is forced to contact the MSE under the adjacent SE. And when the offset between the MSE layer 204 and the TSE layer is greater than 5 times the gap between the MSE's 202, as shown in FIG. 6C, the threat is forced to contact the adjacent MSE 204.

Figure 7A:
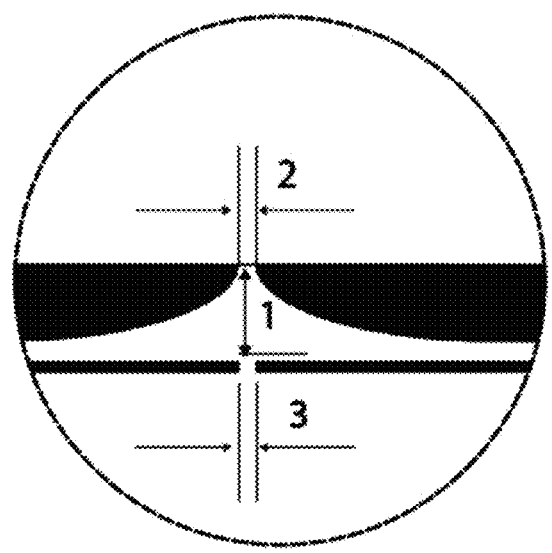
FIGS. 7A and 7B are side views of embodiments having hem-shaped TSE's and flat MSE's, illustrating the offset of the edges when the central portions are in contact.
Figure 7B:
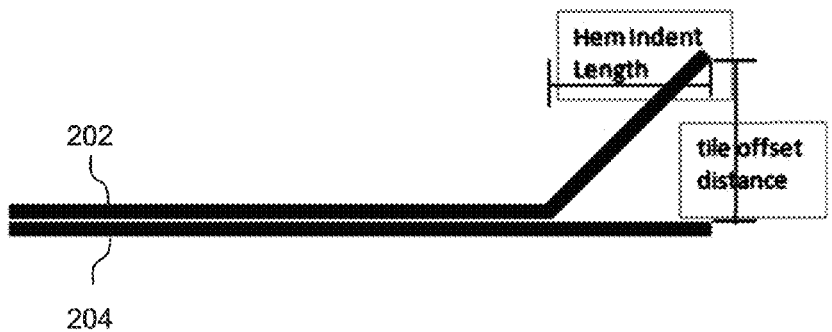

With reference to FIGS. 7A and 7B, in some embodiments when the threat length after penetration is 5 mm, such as for the NIJ Spike per NIJ 0115.00, the offset (1) between solid elements must be more than 18% of the spike diameter, and the gap (2) between solid elements must be less than 15% of the spike diameter. In some embodiments when the threat length after penetration is 5 mm, for example threats such as the NIJ P1 blade per NIJ 0115.00, the offset (1) between solid elements must be more than 18% of the p1 blade thickness, and the gap (2) between solid elements must less than 15% of the p1 blade thickness. And in some embodiments when the threat length after penetration is 5 mm, for example threats such as the NIJ S1 Blade per NIJ 0115.00, the offset between solid elements must be more than 12% of the S1 Blade thickness, and the gap between solid elements must be less than 15% of the S1 Blade thickness.

Figure 8A:
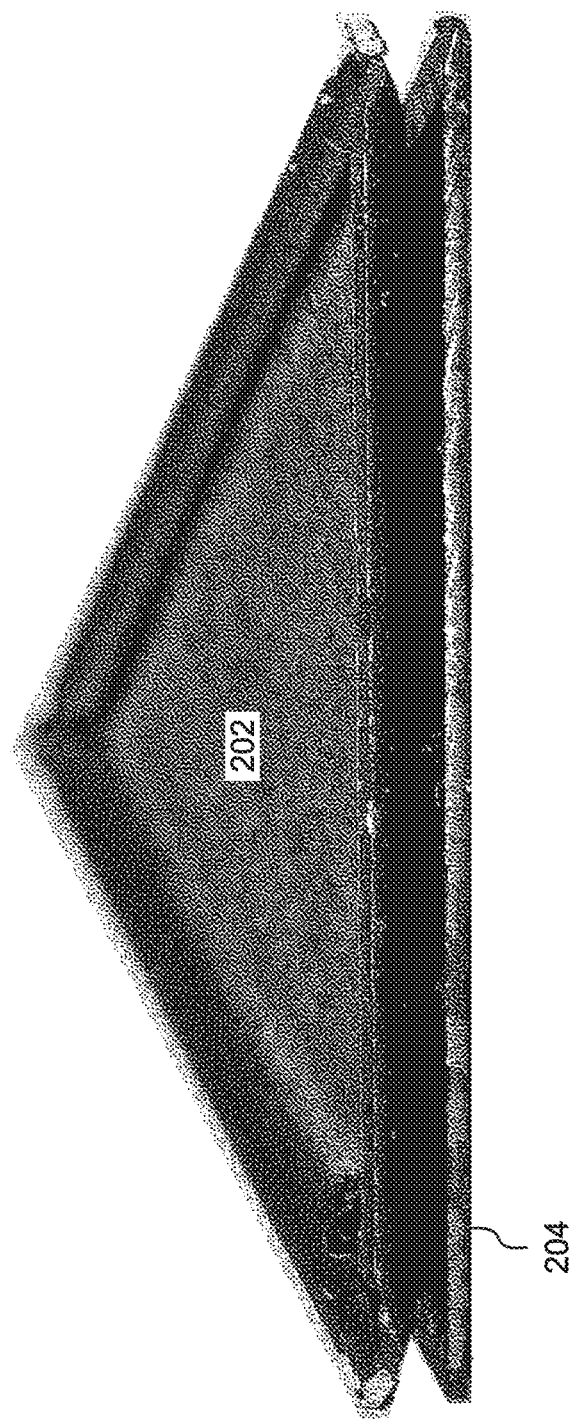
FIG. 8A is a perspective view from above of a pair of triangular TSE and MSE solid elements, where the TSE element has a "hem" shape and the corresponding MSE element is flat.
Figure 8B:
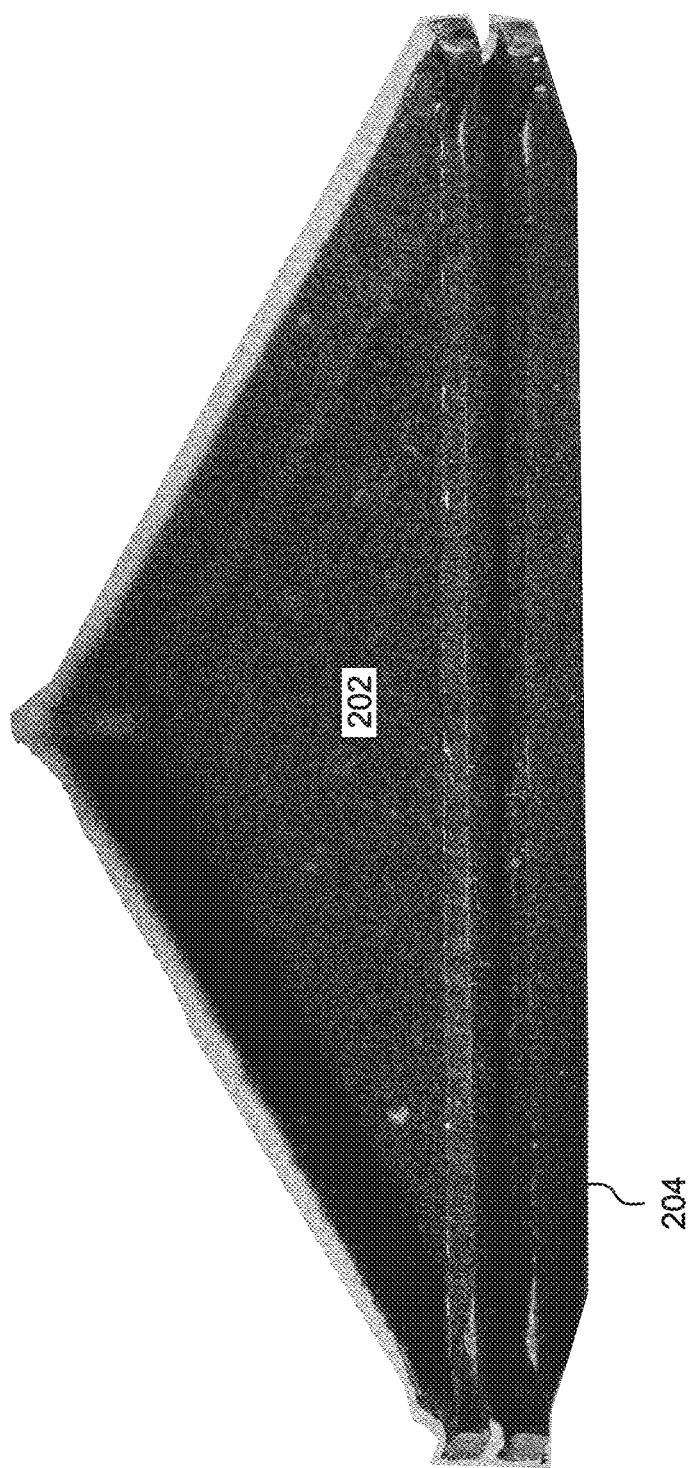
FIG. 8B is a perspective view from above of a pair of triangular TSE and MSE solid elements, where both the TSE element and the MSE elements have a "hem" shape.

FIG. 8A is a perspective view from above of a pair of triangular TSE 202 and MSE 204 solid elements, where the TSE element 202 has a "hem" shape and the MSE element 204 is flat. FIG. 8B is a similar perspective view of an embodiment in which both the TSE element 202 and the MSE element 205 have a "hem" shape.

Figure 9A:
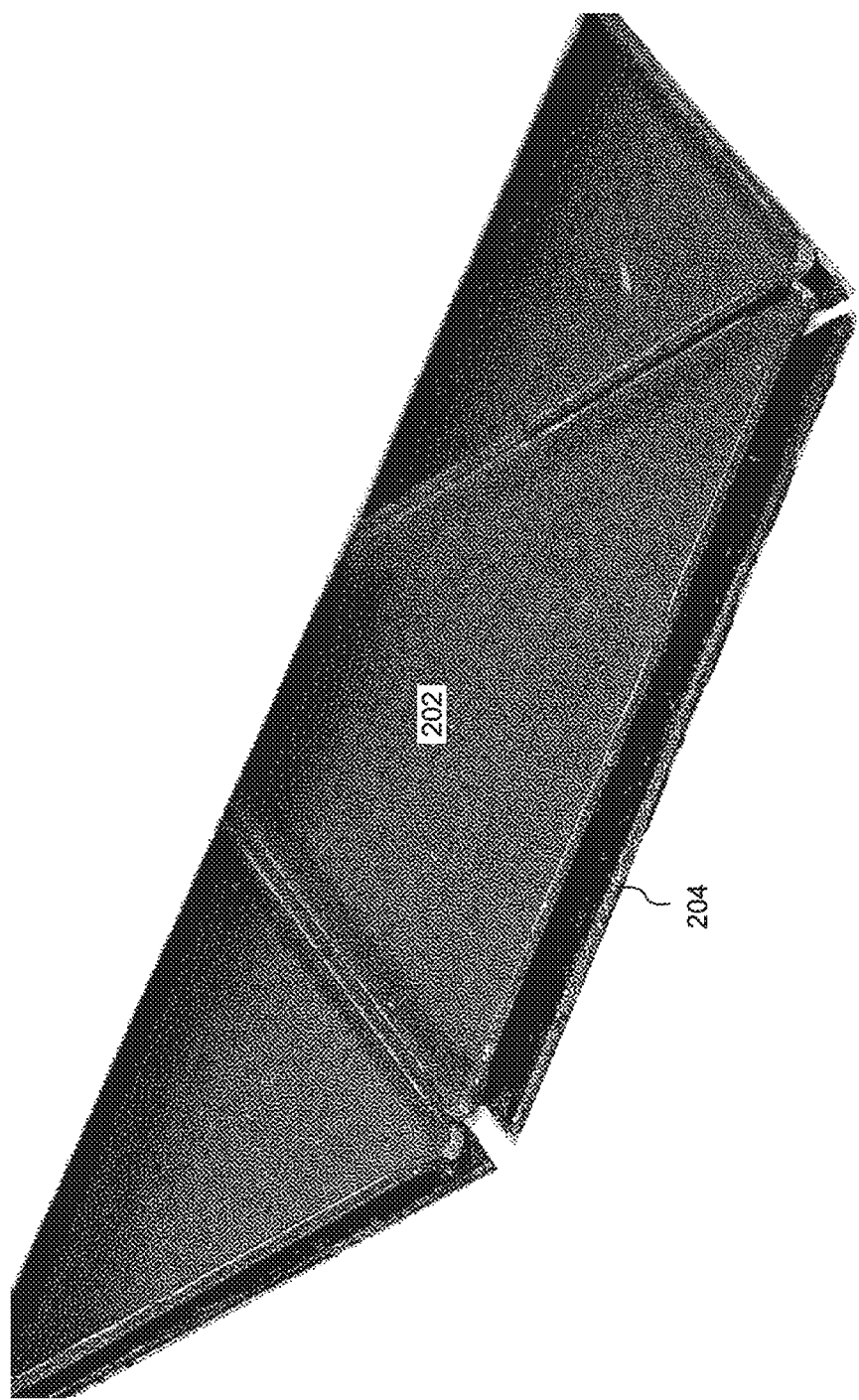
FIG. 9A is a perspective view from above of three pairs of elements similar to FIG. 8A, shown together.
Figure 9B:
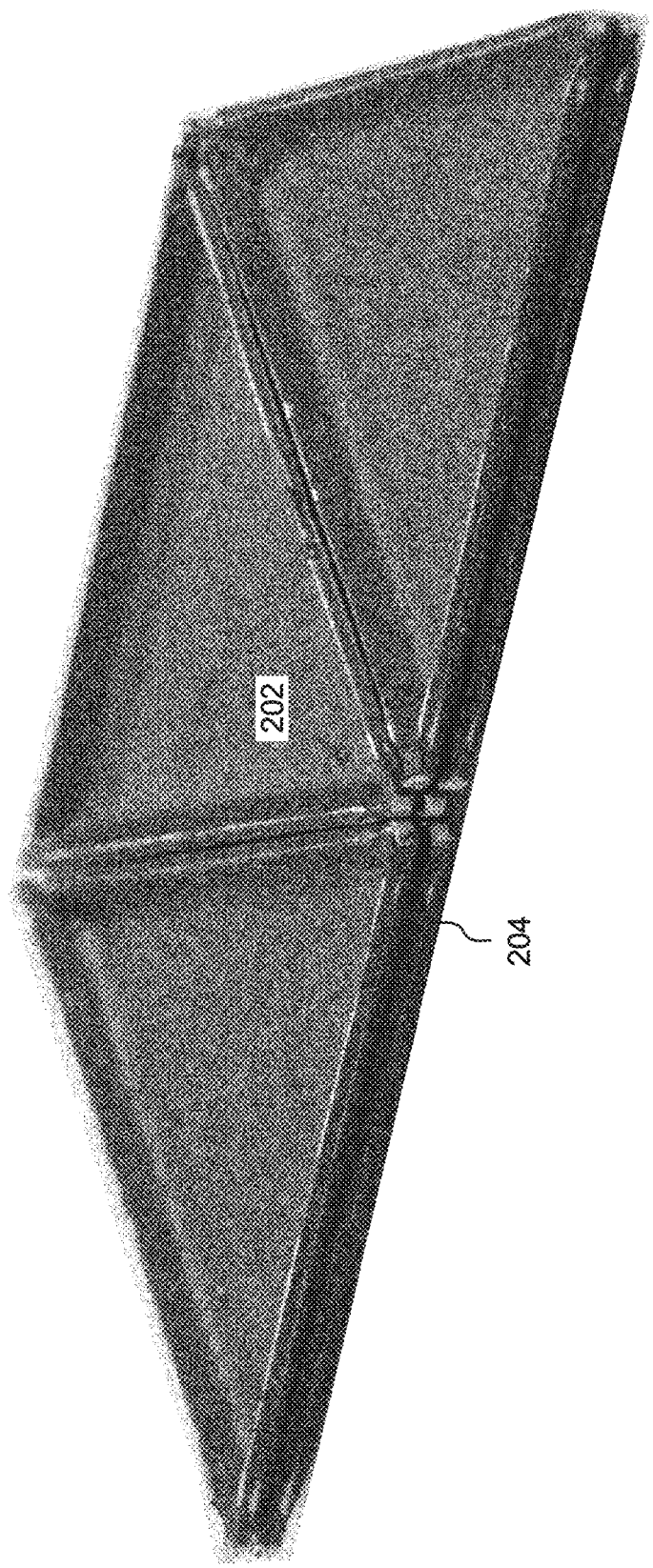
FIG. 9B is a perspective view from above of three pairs of elements similar to FIG. 8B, shown together.

FIG. 9A is a perspective view from above of three pairs of elements shown together, where the elements are similar to those shown in FIG. 8A. FIG. 9B is a perspective view from above of three pairs of elements shown together, where the elements are similar to those shown in FIG. 8B.

Figure 10:
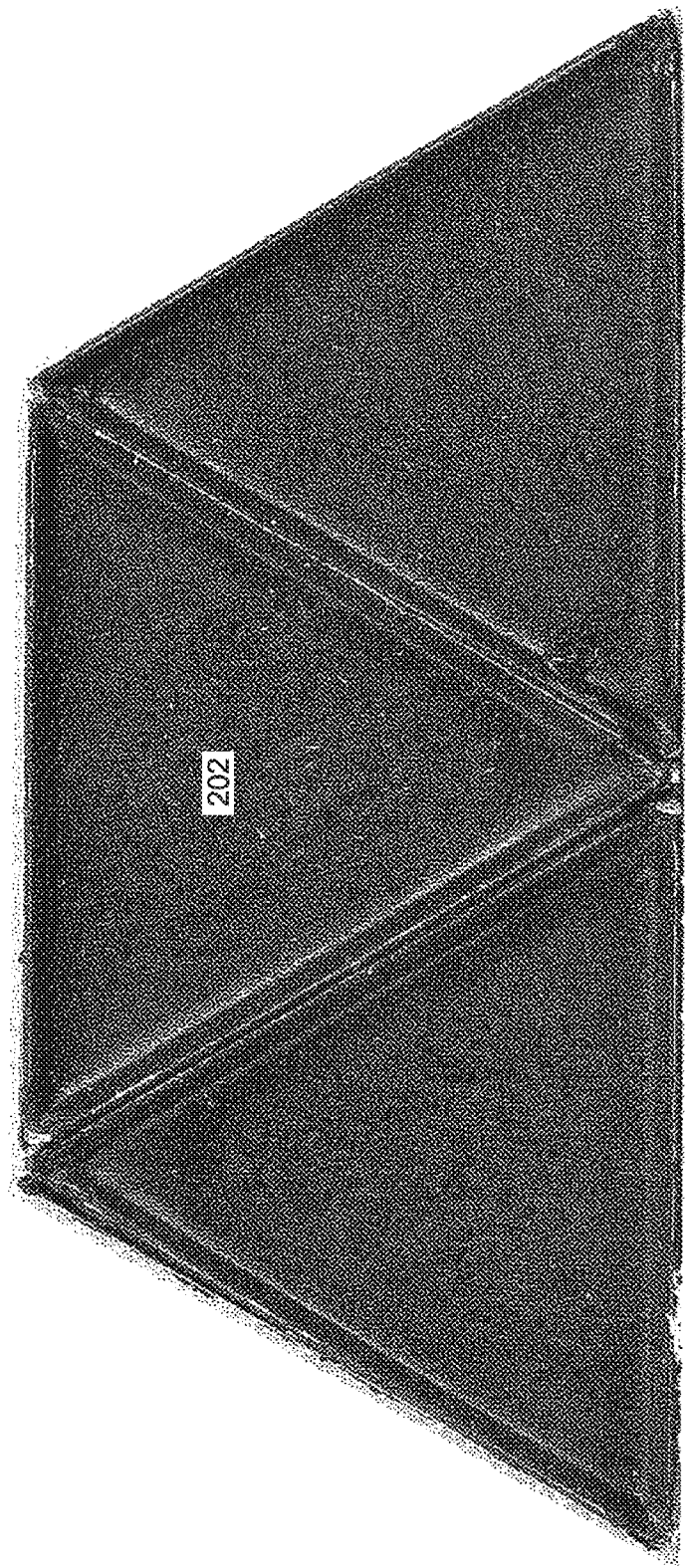
FIG. 10 is a view of the pairs of FIG. 9B shown from directly above.
Figure 11:
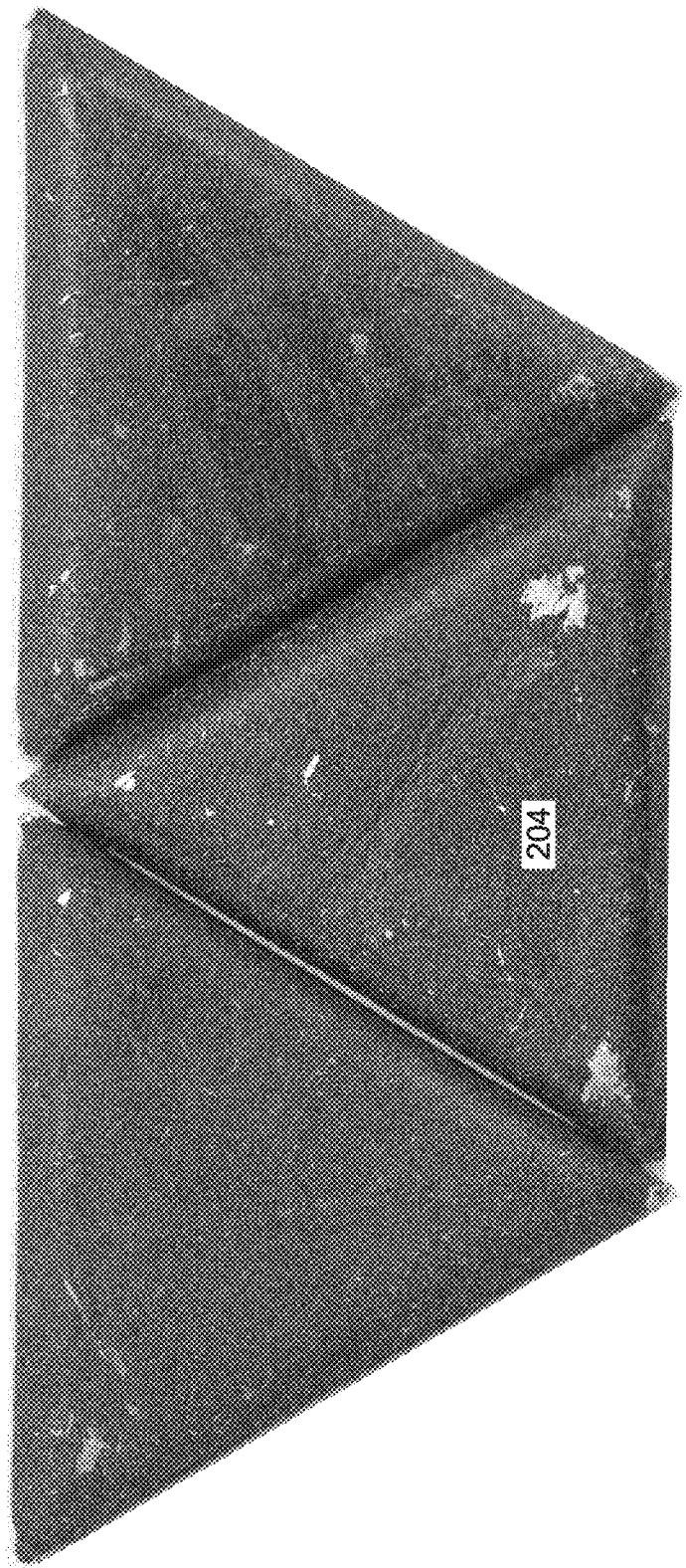
FIG. 11 is a view of the pairs of FIG. 9B shown from directly below.

FIG. 10 is a top view of the pairs of FIG. 9B, and FIG. 11 is a view of the pairs of FIG. 9B shown from directly below.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A mosaic armor system for protection against a stabbing threat having a threat thickness at a failing penetration depth, the armor system comprising:
a top layer of solid elements and a middle layer of solid elements, the solid elements in both layers being arranged in substantially space-filling X-Y arrays in which the solid elements are separated from each other by gaps that intersect at apexes, the gaps having a uniform gap width that is between 5% and 20% of the threat thickness at the failing penetration depth, the middle layer being offset from the top layer in the Z direction by an offset that is at least three times larger than the gap width, a front face of the middle layer being adhered to a back face of the top layer; and
fibrous top and bottom covering layers arranged so as to sandwich the two layers of solid elements there between.

2. The mosaic armor system of claim 1, wherein the top fibrous covering layer is adhered to a front face of the top layer of solid elements.

3. The mosaic armor system of claim 1, wherein the top fibrous covering layer has a recoverable stretch of greater than 30% at less than 20 pounds per inch of load as measured by ASTM method D6614 or D2594.

4. The mosaic armor system of claim 1, wherein the bottom fibrous covering layer has elongation at break of less than 20%.

5. The mosaic armor system of claim 1, further comprising an intermediate fibrous layer located between the top layer of solid elements and the middle layer of solid elements.

6. The mosaic armor system of claim 1, wherein all of the solid elements included in the top and middle layers are made of a material having an Rc hardness of at least 35.

7. The mosaic armor system of claim 1, wherein the solid elements of the top and middle layers substantially share the same outline and are aligned with each other.

8. The mosaic armor system of claim 1, wherein the offset between the top and middle layers of solid elements is at least four times as large as the first gap size.

9. The mosaic armor system of claim 1, further comprising an apex XY layer of solid elements having a front side adhered to a back side of the first fibrous backing layer, the apex solid elements being located directly behind the apexes of the top layer of solid elements.

10. The mosaic armor system of claim 9, further comprising a fibrous backing layer adhered to a back side of the apex layer, so that the apex solid elements are sandwiched between the fibrous bottom covering layer and the fibrous apex backing layer.

11. The mosaic armor system of claim 10, wherein the fibrous apex backing layer has elongation at break of less than 20%.

12. The mosaic armor system of claim 9 further comprising up to 4 fibrous backing layers behind the apex solid element layer.

13. The mosaic armor system of claim 9, wherein the apex solid elements have a largest dimension of greater than 0.2 inches.

14. The mosaic armor system of claim 9, wherein all of the solid elements included in the apex layer are made of a material having an Rc hardness of at least 35.

15. The mosaic armor system of claim 1, wherein the armor system defeats both edged blade and spike threats at 45 degrees at energies up to 24 Joules with less than 7 mm of penetration, and at 0 degrees at energies up to 36 Joules with less than 20 mm of penetration.

16. The mosaic armor system of claim 1, wherein a thickness of the solid elements of the middle layer is between 35% and 250% of a thickness of the solid elements of the top layer.

17. The mosaic armor system of claim 1, wherein the front face of the middle layer is adhered to the back face of the top layer by a first adhesive that includes a neoprene elastomer.

18. The mosaic armor system of claim 1, wherein the top and middle layers of solid elements are attached to each other by an attachment having at least 10 lbf of shear strength per square inch.

19. The mosaic armor system of claim 1, wherein the fibrous bottom covering layer is attached to the middle layer of solid elements by an attachment having greater than 10 lbf of shear strength per square inch.

20. The mosaic armor system of claim 1, further comprising at least one adhesive layer that includes a neoprene elastomer.

21. A mosaic armor system comprising:
a top layer of solid elements and a middle layer of solid elements, the solid elements in both layers being arranged in substantially space-filling X-Y arrays in which the solid elements are separated from each other by gaps that intersect at apexes, the solid elements of the top and middle layers substantially sharing the same outline and being aligned with each other, the solid elements of the top layer having edges that are offset in the Z direction from edges of the solid elements in the middle layer by an offset that is greater than a thickness of the top layer solid elements or a thickness of the middle layer solid elements, a front face of the middle layer being adhered to a back face of the top layer; and
an apex XY layer of solid elements located directly behind the apexes of the top and middle layers of solid elements, said apex layer being not substantially space-filling.

22. The mosaic armor system of claim 21, wherein a thickness of the solid elements of the middle layer is between 35% and 250% of a thickness of the solid elements of the top layer.

23. The mosaic armor system of claim 21, further comprising fibrous top and bottom covering layers arranged so as to sandwich the top and middle layers of solid elements there between.

24. The mosaic armor system of claim 23, wherein the fibrous top covering layer has a recoverable stretch of greater than 30% at less than 20 pounds per inch of load as measured by ASTM method D6614 or D2594.

25. The mosaic armor system of claim 23, wherein the fibrous bottom covering layer has elongation at break of less than 20%.

26. The mosaic armor system of claim 23, wherein the fibrous bottom covering layer is attached to the middle layer of solid elements by an attachment having greater than 10 lbf of shear strength per square inch.

27. The mosaic armor system of claim 21, further comprising an intermediate fibrous layer located between the top layer of solid elements and the middle layer of solid elements.

28. The mosaic armor system of claim 21, wherein the top and middle layers of solid elements are attached to each other by an attachment having at least 10 lbf of shear strength per square inch.

29. The mosaic armor system of claim 21, wherein all of the solid elements included in the top and middle layers are made of a material having an Rc hardness of at least 35.

30. The mosaic armor system of claim 21, wherein all of the solid elements included in the apex layers are made of a material having an Rc hardness of at least 35.

31. The mosaic armor system of claim 21, wherein the armor system defeats both edged blade and spike threats at both 0 degrees and 65 degrees at energies up to 15 Joules with less than 10 mm of penetration, and at energies up to 25 Joules with less than 20 mm of penetration.

32. The mosaic armor system of claim 21, wherein an offset between the top and middle layers of solid elements is greater than or equal to the gap between the solid elements in each of the top and middle layers.

33. The mosaic armor system of claim 21, wherein an offset between the top and middle layers of solid elements is greater than or equal to the thickness of the top layer of solid elements or the middle layer of solid elements.

34. The mosaic armor system of claim 21, further comprising fibrous top and bottom covering layers arranged so as to sandwich the top and middle layers of solid elements there between, and a fibrous backing layer adhered to a back side of the apex layer, so that the apex solid elements are sandwiched between the fibrous bottom covering layer and the fibrous backing layer.

35. The mosaic armor system of claim 34, wherein the fibrous backing layer has elongation at break of less than 20%.

36. The mosaic armor system of claim 21 further including up to 4 fibrous backing layers adhered to a back side of the apex solid element layer.

37. The mosaic armor system of claim 21, wherein the apex solid elements have a largest dimension that is greater than 0.2 inches.

38. The mosaic armor system of claim 21, wherein the front face of the middle layer is adhered to the back face of the top layer by a first adhesive that includes a neoprene elastomer.

39. A mosaic armor system comprising:
a top layer of solid elements and a middle layer of solid elements, the solid elements in both layers being arranged in substantially space-filling X-Y arrays in which the solid elements are separated from each other by gaps that intersect at apexes, the solid elements of the top and middle layers substantially sharing the same outline and being aligned with each other; and
fibrous top and bottom covering layers attached by adhesive layers to the two layers of solid elements and arranged so as to sandwich the two layers of solid elements there between, the fibrous top covering layer having a recoverable stretch of greater than 30% at less than 20 pounds per inch of load as measured by ASTM method D6614 or D2594, the fibrous bottom covering layer having elongation at break of less than 20%.

40. The mosaic armor system of claim 39, wherein the top and middle layers of solid elements are attached to each other by an attachment having at least 10 lbf per square inch of shear strength.

41. The mosaic armor system of claim 39, wherein the fibrous bottom covering layer is attached to the middle layer of solid elements by an attachment having greater than 10 lbf of shear strength per square inch.

42. The mosaic armor system of claim 39, wherein all of the solid elements included in the top layer are made of a material having an Rc hardness of at least 35.

43. The mosaic armor system of claim 39, further comprising an intermediate fibrous layer located between the top layer of solid elements and the middle layer of solid elements.

44. The mosaic armor system of claim 39, further comprising an apex XY layer of solid elements located directly behind the apexes of the top and middle layers of solid elements.

45. The mosaic armor system of claim 44, further comprising a fibrous backing layer adhered to a back side of the apex layer, so that the apex solid elements are sandwiched between the fibrous bottom covering layer and the fibrous backing layer.

46. The mosaic armor system of claim 44, further comprising up to 4 fibrous backing layers adhered to a back side of the apex layer, so that the apex solid elements are sandwiched between the fibrous bottom covering layer and the two fibrous backing layers.

47. The mosaic armor system of claim 46, wherein at least one of the fibrous backing layers has elongation at break of less than 20%.

48. The mosaic armor system of claim 44, wherein the apex solid elements have a largest dimension of greater than 0.2 inches.

49. The mosaic armor system of claim 44, wherein all of the solid elements included in the apex layers are made of a material having an Rc hardness of at least 35.

50. A mosaic armor system comprising:
a top layer of solid elements and a middle layer of solid elements, the solid elements in both layers being arranged in substantially space-filling X-Y arrays in which the solid elements are separated from each other by gaps that intersect at apexes, the solid elements of the top and middle layers substantially sharing the same outline and being aligned with each other;
an apex XY layer of solid elements located directly behind the apexes of the top and middle layers of solid elements;
a fibrous bottom covering layer arranged between the middle layer of solid elements and the apex layer of solid elements, the fibrous bottom covering layer having elongation at break of less than 20%; and
a fibrous backing layer adhered to a back side of the apex layer, so that the apex solid elements are sandwiched between the fibrous bottom covering layer and the fibrous backing layer.

51. The mosaic armor system of claim 50, wherein all of the solid elements included in the top and middle layers are made of a material having an Rc hardness of at least 35.

52. The mosaic armor system of claim 50, wherein all of the solid elements included in the apex layers are made of a material having an Rc hardness of at least 35.

53. The mosaic armor system of claim 50, further comprising an additional fibrous backing layer adhered to a back side of the apex layer, so that the apex solid elements are sandwiched between the fibrous bottom covering layer and the two fibrous backing layers.

54. The mosaic armor system of claim 53, wherein at least one of the fibrous backing layers has elongation at break of less than 20%.

55. The mosaic armor system of claim 50, wherein the top and middle layers of solid elements are attached to each other by an attachment having at least 10 lbf of shear strength per square inch.

56. The mosaic armor system of claim 50, further comprising an intermediate fibrous layer located between the top layer of solid elements and the middle layer of solid elements.

57. The mosaic armor system of claim 50, wherein the fibrous bottom covering layer is attached to the middle layer of solid elements by an attachment having greater than 10 lbf of shear strength per square inch.

58. The mosaic armor system of claim 50, wherein the apex solid elements have a largest dimension of greater than 0.2 inches.

* * * * *